Patented May 14, 1946

2,400,067

UNITED STATES PATENT OFFICE 2,400,067

BITUMINOUS COMPOSITIONS

Joseph C. Best, Port Arthur, and Ralph N. Traxler and Herbert E. Schweyer, Port Neches, Tex., assignors to The Texas Company, New York, N. Y., a corporation of Delaware No Drawing. Application March 30, 1944, Serial No. 528,778

4 Claims. (Cl. 196—152)

Our invention relates to bituminous compositions, and particularly to normally solid bituminous compositions having temperature-consistency characteristics permitting low viscosity liquid flow at moderately elevated temperatures.

In the past, bituminous compositions of commercial utility have been normally liquid materials such as tars or road oils, or solid materials such as asphalts or pitches which require relatively high temperatures to obtain flow or workability. The utilization of these solid bituminous materials at low temperatures has thus required the use of a volatile solvent. In many cases, however, the use of a solvent is not only undesirable from a cost standpoint, but is impractical or inoperative for technological reasons. Furthermore, solid bituminous compositions which have negligible flow at moderately elevated temperatures have the additional disadvantage of high average molecular weight and relatively poor compatibility with other plastics such as rubber, synthetic elastomers, and the like.

An object of our present invention is to provide a bituminous composition which is essentially solid at normal atmospheric temperatures and is capable of low viscosity liquid flow at moderately elevated temperatures.

A further object of our invention is to provide a bituminous composition which is essentially solid at ordinary room temperatures, is not excessively hard or brittle at freezing temperatures, and is a relatively mobile liquid at temperatures above 200° F.

Another object of our invention is to provide a bituminous material of the character described above, having a chemical composition adapted for compatibility with other organic plastics.

An additional object of our invention is to provide a bituminous composition adapted for use as an extender in the compounding of natural or synthetic elastomers.

Other objects and advantages of our invention will be evident from the following description.

The bituminous compositions of our present invention are characterized by melting points (B. & R.) above 85° F., viscosities (Saybolt Furol) below 250 sec. at 210° F., relatively low bromine numbers, high ratios of naphthenic to paraffinic constituents, and high ratios of asphaltenes to asphaltic resins. This particular combination of characteristics may be obtained in products derived from various types of bituminous charge stocks by suitable processing and blending operations. However, a very simple and economic method of preparation comprises the reduction or concentration of cracked residua obtained from the cracking of petroleum hydrocarbons. Our invention will be illustrated with particular reference to bituminous compositions prepared in this manner.

Cracked residua such as residual fuel oils or pressure tars are usually obtained from petroleum cracking units as bottoms from a flash drum, tar stripper, or primary fractionator. For reasons of operating expediency, such residua are normally drawn off as liquids of relatively low viscosity. Further concentration or reduction will therefore usually be required to produce the bituminous compositions of the present invention. However, it should be understood that higher melting residua having the characteristics herein set forth may be obtained directly from a cracking unit by suitably modifying the operating conditions of the fractionator from which the residuum is obtained. In such case, a higher end-point recycle stock may be taken overhead and insulated or heated lines may be provided for withdrawing the bottoms in a fluid state.

Although residua from all types of cracking of petroleum hydrocarbons may be utilized in accordance with the present invention, it is desirable to employ residual oils of a highly refractory or aromatic character, low in carbene content, and colloidally stable. We prefer, therefore, to utilize residua from the thermal cracking of charge stocks of predominantly distillate character. Very satisfactory residua are obtained from gas oil cracking, and from the cracking of mixed charge stocks containing limited amounts of crudes or reduced crudes. The preferred cracking stocks contain less than 50% by volume of components substantially less volatile than gas oils. It will be evident, of course, that the volatile fraction of a blended cracking stock may be made up entirely of distillate components, or in part by volatile constituents of crude oil or topped crude oil components. If the less volatile components are derived from asphalt base crudes, it is desirable to incorporate less than 30% by volume of such materials in the composite cracking stock. The preferred residua for the preparation of our bituminous compositions are derived from the cracking of stocks which are predominantly paraffin base or mixed base, with respect to both the distillate and residual components.

The processing of normally liquid cracked residua should be effected in such a manner as to obtain the desired melting point and viscosity characteristics of the final products. Substantial oxidation during the processing will tend to produce an unduly high viscosity at 210° F. for a composition of the desired melting point. Overheating will tend to destroy the colloidal stability of the products, and decrease their compatibility with other organic plastics. For these reasons it is preferred to effect the concentration or reduction of normally liquid residua by vacuum or steam distillation. Air blowing during the processing may be utilized to a limited extent for modification of the product characteristics, but in general we prefer to employ vacuum or steam distillation without any air blowing.

The concentration or reduction can be controlled by periodic determinations of melting point and viscosity characteristics. If the concentration is carried moderately beyond the desired product consistency, the material may be fluxed back with a less concentrated residuum. Alternatively, other hydrocarbon stocks such as Edeleanu extracts, furfural extracts, and the like may be employed as fluxes. Such extracts or other modifying agents may also be incorporated in liquid residua prior to concentration, or may be blended with solid residua obtained directly from cracking units.

Irrespective of the particular method of preparation, the final products should have a B. & R. melting point above 85° F. and desirably in the range 85–125° F., and the Saybolt Furol viscosity at 210° F. should be less than 250 seconds and desirably in the range 150–250 seconds. The specific gravity will usually be in the range 0.95–1.15 at 60° F. and the asphalt penetration may range from 7.5 to 30.0 mm. at 77° F. and from 0.3 to 3.0 mm. at 32° F.

In order to obtain adequate compatibility with natural rubber, synthetic elastomers, or other organic plastics, it is desirable that the bituminous compositions of the above character have certain chemical characteristics indicated by bromine number and analysis for the following constituents:

*Asphaltenes.*—Insoluble in 100 volumes of 86° A. P. I. paraffinic naphtha at 77° F. Insoluble in 20 volumes of liquid propane at 160° F.

*Resins.*—Soluble in 100 volumes of 86° A. P. I. paraffinic naphtha at 77° F. Insoluble in 20 volumes of liquid propane at 160° F.

*Paraffinic oils.*—Soluble in 20 volumes of liquid propane at 160° F. Insoluble in 20 volumes of acetone at −20° F.

*Naphthenic oils.*—Soluble in 20 volumes of liquid propane at 160° F. Soluble in 20 volumes of acetone at −20° F.

The asphaltene content of our preferred compositions may suitably be within the range 15–25% by weight, and is preferably 18–22% by weight. The resin content will usually be in the range 1–8% by weight, and is preferably 2–6% by weight. The ratio of asphaltenes to resins should be at least 2/1 and preferably ranges from 3/1 to 10/1.

The paraffinic oil content of our preferred compositions may suitably be within the range 5–25% by weight, and is preferably 10–20% by weight. The naphthenic oil content will usually be in the range 40–80% by weight, and is preferably 50–70% by weight. The ratio of naphthenic oil to paraffinic oil should be at least 2/1 and preferably ranges from 3/1 to 6/1.

The bromine number of our preferred bituminous compositions should be below 50 and may suitably range from 5 to 45.

The bituminous compositions of the above characteristics are admirably suited for uses requiring workability, or application in the liquid state, at only moderately elevated temperatures. Thus, they may be used for impregnating fabrics or other porous materials which may be subject to damage at the elevated temperatures required for the usual solid bituminous impregnating agents. These compositions may also be employed for electric insulation in applications where the service temperatures will be sufficiently low to prevent undue softening or liquefaction. Other applications of a similar nature will, of course, be apparent to those skilled in the art.

An outstanding characteristic of our bituminous compositions is their compatibility with other organic plastics and their utility as extenders in compounded elastomer stocks. For example, these materials may be substituted for butadiene-styrene elastomers in amounts up to 25% in mechanical rubber goods formulations without exceeding specifications for modulus at 500% elongation, ultimate tensile strength, or other essential characteristics of the products. The milling, compounding, and vulcanizing of these elastomer stocks may be effected in accordance with known practices when using other types of rubber extenders.

It will also be evident to those skilled in the art that our compositions may be incorporated with other organic plastics, especially those of essentially hydrocarbon character. In such composite plastics our bituminous materials may serve as extenders or plasticizers in molding compounds, varnishes, paints, electric insulating materials, and the like.

Our invention will be further illustrated by the following specific examples:

*Example I*

A cracked residual fuel oil of 24 sec. Saybolt Furol viscosity at 210° F., obtained from low-liquid level coil and drum cracking of a Mid-Continent gas oil, was reduced by vacuum distillation to a 210° F. Saybolt Furol viscosity of 176 sec. The resulting product had the following characteristics:

| | |
|---|---:|
| Specific gravity @ 60° F. | 1.080 |
| Melting point, B. & R. °F. | 97 |
| Viscosity, Saybolt Furol @ 210° F. sec. | 176 |
| Asphalt penetration @ 77° F. mm. | 22.5 |
| Asphalt penetration @ 32° F. mm. | 2.1 |
| Asphaltenes per cent. | 19.6 |
| Resins do. | 6.3 |
| Paraffinic oils do. | 19.2 |
| Naphthenic oils do. | 54.8 |

*Example II*

A cracked residual fuel oil obtained from low-liquid-level coil and drum cracking of a distillate charge stock comprising 76% by volume of a Mid-Continent gas oil and 24% by volume of gas oil from an asphalt base Gulf Coast crude, had the following characteristics:

| | |
|---|---:|
| Specific gravity @ 60° F. | 1.037 |
| Gravity, °A. P. I. | 4.9 |
| Viscosity, Saybolt Furol @ 210° F. | 16 |
| Bromine No. | 36 |

This fuel oil was reduced by vacuum distillation to a still temperature of 510° F. at a vacuum of 29.2 in Hg. The resulting product had the following characteristics:

| | |
|---|---:|
| Specific gravity @ 60° F. | 1.100 |
| Melting point, B. & R. °F. | 105 |
| Viscosity, Saybolt Furol @ 210° F. sec. | 198 |
| Asphalt penetration @ 77° F. mm. | 12.9 |
| Asphalt penetration @ 32° F. mm. | 1.1 |
| Bromine No. | 40 |
| Asphaltenes per cent. | 20.0 |
| Resins do. | 2.4 |
| Paraffinic oils do. | 13.0 |
| Naphthenic oils do. | 64.6 |

Example III

A cracked residual fuel oil obtained from superclean circulation coil and drum cracking (heat applied to the clean recycle gas oil stream) of a charge stock comprising about 24% by volume of Gulf Coast crude oil, about 14% by volume of reduced Mid-Continent crude, and the balance distillate stocks of essentially gas oil range, had the following characteristics:

| | |
|---|---|
| Special gravity @60° F | 1.059 |
| Gravity, °A. P. I | 2.1 |
| Viscosity, Saybolt Furol @210° F | 25 |
| Bromine No | 36 |

This fuel was reduced by steam distillation to a still temperature of 600° F. The resulting product had the following characteristics:

| | |
|---|---|
| Specific gravity @60° F | 1.087 |
| Melting point, B. & R °F | 105 |
| Viscosity, Saybolt Furol @210° F sec | 218 |
| Asphalt penetration @77° F mm | 11.4 |
| Asphalt penetration @32° F mm | 1.4 |
| Bromine No | 24 |
| Asphaltenes per cent | 21.4 |
| Resins do | 3.5 |
| Paraffinic oils do | 13.1 |
| Naphthenic oils do | 62.0 |

The bituminous compositions of each of the above examples was employed as an extender in a "Buna-S" or "GR-S" mechanical goods formulation in amounts in excess of 20% of the normal elastomer content. The molded and vulcanized products in all cases met required specifications for mechanical rubber goods suitable for the manufacture of boots, heels, hot-water bags, and the like.

It is to be understood, of course, that the above examples are merely illustrative and do not limit the scope of our invention. Various types of cracked residua other than those used in the examples may be employed for the production of our compositions, and the characteristics of the resulting products may differ from the particular values given in these examples, but within the limits hereinbefore specified. Likewise, the compositions may be employed in conjunction with elastomers or organic plastics other than the butadiene-styrene material with which these particular compositions were used. In general it may be said that the use of any equivalents or modifications of procedure which would naturally occur to those skilled in the art is included in the scope of our invention. Only such limitations should be imposed on the scope of this invention as are indicated in the appended claims.

We claim:

1. A bituminous composition comprising a concentrated residuum from the cracking of a petroleum hydrocarbon cracking stock derived from non-asphaltic base crude oils, said concentration being effected by distillation at a temperature below the atmospheric boiling point of said residuum and in the absence of substantial oxidation, and said concentrated residuum possessing a bromine number below 50, a ratio of asphaltene content to resin content of at least 2:1, and a ratio of naphthenic oil content to paraffinic oil content of at least 2:1.

2. A bituminous composition comprising a concentrated residuum from the cracking of a petroleum hydrocarbon cracking stock of predominantly gas oil boiling range derived from non-asphaltic base crude oils, said concentration being effected by distillation at substantially atmospheric pressure in the absence of substantial oxidation, and said resulting concentrated residuum being characterized by a bromine number below 50, a ratio of asphaltene content to resin content of at least 2:1, and a ratio of naphthenic oil content to paraffinic oil content of at least 2:1.

3. A plastic extender for organic elastomers of essentially hydrocarbon character, comprising a concentrated residuum from the cracking of petroleum hydrocarbon cracking stock of predominantly gas oil boiling range derived from non-asphaltic base crude oils, the concentration of which is effected by distillation at temperatures below the atmospheric boiling point of said residuum and in the absence of substantial oxidation, said resulting concentrated residuum having a B. & R. melting point in excess of 85° F., a Saybolt Furol viscosity below 250 seconds at 210° F., a bromine number below 50, a ratio of asphaltene content to resin content of at least 2:1 and a ratio of naphthenic oil content to paraffinic oil content of at least 2:1.

4. A bituminous composition comprising a concentrated residuum from the cracking of petroleum hydrocarbon cracking stock derived from non-asphaltic base crude oils, said residuum being concentrated in the absence of substantial oxidation and being characterized by a Saybolt Furol viscosity below 250 seconds at 210° F., a bromine No. below 50, a ratio of asphaltene content to resin content of at least 2:1, and a ratio of naphthenic oil content to paraffinic oil content of at least 2:1.

JOSEPH C. BEST.
RALPH N. TRAXLER.
HERBERT E. SCHWEYER.